(12) United States Patent
Sasaki et al.

(10) Patent No.: US 6,288,762 B1
(45) Date of Patent: Sep. 11, 2001

(54) LIQUID CRYSTAL DISPLAY DEVICE OPERABLE IN A VERTICALLY ALIGNED MODE IN WHICH THE LIQUID CRYSTAL MOLECULES TILT IN THE THIRD DOMAIN AND IN A DIRECTION PERPENDICULAR TO BOTH OF THE FIRST AND SECOND DIRECTION WHEN THE DRIVING IN ACTIVE STATE

(75) Inventors: Takahiro Sasaki; Shingo Kataoka; Arihiro Takeda; Katsufumi Ohmuro; Yoshio Koike, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/959,609

(22) Filed: Oct. 28, 1997

(30) Foreign Application Priority Data

Apr. 28, 1997 (JP) .................................................. 9-111377

(51) Int. Cl.⁷ ................................................ G02F 1/1337

(52) U.S. Cl. ........................... 349/129; 349/129; 349/130; 349/124; 349/123

(58) Field of Search ..................................... 349/129, 130, 349/124, 123

(56) References Cited

U.S. PATENT DOCUMENTS 5,825,448 * 10/1998 Boe et al. ............................. 349/128
6,040,885 * 3/2000 Koike et al. ......................... 349/129

* cited by examiner

Primary Examiner—Kenneth Parker
Assistant Examiner—Mike Qi
(74) Attorney, Agent, or Firm—Greer, Burns & Crain, Ltd.

(57) ABSTRACT

A vertically aligned liquid crystal display device includes, in addition to first and second principal domains in which liquid crystal molecules tilt in opposite directions in response to an application of a driving electric field, a micro-domain between the first and second principal domains such that the liquid crystal molecules tilt in a direction perpendicular to any of the tilting directions in the first and second principal domains.

16 Claims, 14 Drawing Sheets

$|a| > |c|$ $|b| < |d|$

LIQUID CRYSTAL DISPLAY DEVICE OPERABLE IN A VERTICALLY ALIGNED MODE IN WHICH THE LIQUID CRYSTAL MOLECULES TILT IN THE THIRD DOMAIN AND IN A DIRECTION PERPENDICULAR TO BOTH OF THE FIRST AND SECOND DIRECTION WHEN THE DRIVING IN ACTIVE STATE

BACKGROUND OF THE INVENTION

The present invention generally relates to liquid crystal display devices and more particularly to a liquid crystal display device operating in a so-called VA-(vertically aligned) mode in which liquid crystal molecules are aligned generally perpendicularly to a liquid crystal layer.

Liquid crystal display devices are used extensively for a display device of various information processing apparatuses such as a computer. Liquid crystal display devices, having a compact size and consuming little electric power, are particularly suitable for application in portable information processing apparatuses. On the other hand, use of such liquid crystal display devices also in a fixed-type information processing apparatus such as a desktop-type computer, is also studied intensively.

Conventional liquid crystal display devices generally use a so-called TN (Twisted Nematic)-mode construction in which p-type liquid crystal molecules having a positive dielectric anisotropy are aligned horizontally between a pair of mutually opposing panel substrates, such that the liquid crystal molecules adjacent to one panel substrate and the liquid crystal molecules adjacent to the other panel substrate are aligned in respective directions crossing with each other perpendicularly.

In such a TN-mode liquid crystal display device, a pair of polarizers are disposed above and below the liquid crystal panel with a crossed Nicol state in which respective optical absorption axes intersect each other perpendicularly. Thereby, a white representation is given in a non-activated state of the liquid crystal display device in which no driving electric field is applied across the liquid crystal layer. In an activated state in which a driving electric field is applied across the liquid crystal layer, on the other hand, a black representation is obtained.

In the foregoing black representation mode of the TN-mode liquid crystal display device, it should be noted that the liquid crystal molecules are aligned generally vertically to the principal surface of the panel substrate as a result of the driving electric field thus applied across the liquid crystal layer, and the transmission of the incident optical beam through the liquid crystal display device is effectively interrupted by the polarizers disposed above and below the liquid crystal panel.

In such a black representation mode, however, the liquid crystal molecules immediately adjacent to the panel substrate tend to maintain the horizontal alignment even when the driving electric field is applied. Thereby, the polarization state of the incident optical beam is affected by such horizontally aligned liquid crystal molecules and leakage of light occurs even in the black representation mode. In other words, conventional TN-mode liquid crystal display devices have suffered from the problem of low contrast ratio of representation.

A VA-mode liquid crystal display device is a liquid crystal display device in which liquid crystal molecules having a negative dielectric anisotropy are confined between a pair of panel substrates in a state that the liquid crystal molecules are aligned in a direction generally perpendicular to the principal surface of the liquid crystal layer in the non-activated state of the liquid crystal display device. Thus, an incident optical beam passes through the liquid crystal layer without changing the polarization plane thereof in the non-activated state of the liquid crystal device, and the incident optical beam is effectively interrupted by a pair of polarizers disposed above and below the liquid crystal layer in a crossed Nicol state. In such a VA-mode liquid crystal display device, therefore, it is possible to achieve a near-ideal black representation in the non-activated state of the liquid crystal display device. In other words, such a VA-mode liquid crystal display device can easily achieve a very high contrast representation not achievable by a conventional TN-mode liquid crystal display device.

When a VA-mode liquid crystal display device is to be used for a desktop information processing apparatus, the VA-mode liquid crystal display device is required, in addition to the high contrast ratio, to have a wide view angle and a high response speed. In relation to the view angle, conventional VA-mode liquid crystal display devices have generally suffered from the problem of inverted gradation which occurs when the liquid crystal panel is viewed from a direction in which the liquid crystal molecules cause a tilting upon application of the driving electric field.

In conventional TN-mode liquid crystal display devices, such a problem of view angle has been dealt with by dividing each pixel into a plurality of domains having respective alignment directions of the liquid crystal molecules. The art of forming such a so-called divided alignment domain structure is well established in the art of TN-mode liquid crystal display devices.

FIGS. 1A and 1B show respectively the surface of a conventional TN-mode liquid crystal display device and a corresponding cross-sectional structure in an activated state thereof.

Referring to the cross sectional view of FIG. 1B, the liquid crystal display device includes a liquid crystal layer 2 sandwiched between a substrate 1A and a substrate 1B, and the liquid crystal layer 2 is divided into a domain A and a domain B adjacent to the domain A, wherein it should be noted that the direction of tilting of the liquid crystal molecules, which occurs in response to the application of a driving electric field to the liquid crystal layer 2, is opposite in the domain A and in the domain B. Further, it should be noted that, at the boundary between the domain A and the domain B, there is formed a boundary region in which the liquid crystal molecules maintain a horizontal alignment even when a driving electric field is applied thereto. In correspondence to the boundary region thus formed, a bright disclination line is observed as indicated in FIG. 1A. In FIG. 1A, it should be noted that the polarizers above and below the liquid crystal panel are disposed in the crossed Nicol state and the domains A and B can be seen as black bands.

Thus, one may expand the use of the foregoing teaching of divided alignment domain structure further to the case of a VA-mode liquid crystal display device for improving the view angle characteristics thereof.

FIG. 2 shows a simple expansion of the divided alignment domain structure to a VA-mode liquid crystal display device as noted above, wherein those parts corresponding to the parts described previously are designated by the same reference numerals and the description thereof will be omitted.

Referring to FIG. 2, the liquid crystal layer 2, which now includes vertically aligned liquid crystal molecules, is divided into a domain A and an adjacent domain B, wherein the direction of tilting of the liquid crystal molecules is opposite in the domain A and in the domain B. However, there is little investigation made on such a divided alignment domain structure in a VA-mode liquid crystal display device, and it is not clear at all whether the structure of FIG. 2 can be actually formed at all as a stable structure. It should be noted that the structure of FIG. 2 is merely a hypothetical structure and the stability or feasibility thereof is not yet investigated.

SUMMARY OF THE INVENTION

Accordingly, it is a general object of the present invention to provide a novel and useful VA-mode liquid crystal display device wherein the foregoing problems are successfully eliminated.

Another and more specific object of the present invention is to provide a VA-mode liquid crystal display device having an improved view angle characteristic.

Another object of the present invention is to provide a vertically aligned mode liquid crystal display device having a divided alignment domain structure realized stably in a liquid crystal layer.

Another object of the present invention is to provide a vertically aligned liquid crystal display device, comprising:

a first substrate;

a second substrate substantially parallel to said first substrate;

a liquid crystal layer confined between said first and second substrates and including liquid crystal molecules aligning in a direction generally perpendicular to a principal surface of said first substrate when no substantial electric field is applied to said liquid crystal layer;

a first driving electrode provided on said first substrate; and a second driving electrode provided on said second substrate;

said liquid crystal layer including: a first domain in which said liquid crystal molecules are aligned in a first direction upon application of a driving electric field across said liquid crystal layer; a second domain in which said liquid crystal molecules are aligned in a second, opposite direction upon application of said driving electric field across said liquid crystal layer; and a third domain extending between said first and second domains in the form of a band, wherein said liquid crystal molecules tilt, in said third domain, in a direction perpendicular to both of said first and second directions when said driving electric field is applied across said liquid crystal layer.

According to the present invention, a stable domain structure is realized in the VA-mode liquid crystal layer as a result of formation of the third domain which extends between the first and second domains in the form of a band. As the direction of molecular alignment is different in any of the first through third domains, particularly in the first and second domains, the view angle characteristic of the VA-mode liquid crystal display device of the present invention is improved substantially, similarly to the conventional TN-mode liquid crystal display devices. Because of the fact that the tilting direction of the liquid crystal molecules in the third domain is perpendicular to the tilting direction of the liquid crystal molecules in the first or second domain, the tilting of the liquid crystal molecules in the third domain, which occurs in response to the ON/OFF of the driving electric field applied to the liquid crystal layer, does not cause an interference with the corresponding tilting of the liquid crystal molecules in the first or second domain. Thus, the liquid crystal display device of the present invention shows an excellent response.

Another object of the present invention is to provide a method of fabricating a vertically aligned mode liquid crystal display device comprising a liquid crystal layer confined between first and second substrates, said liquid crystal layer including liquid crystal molecules aligning in a direction generally perpendicular to a principal surface of said first substrate when no substantial electric field is applied to said liquid crystal layer; said liquid crystal layer including: a first domain in which said liquid crystal molecules are aligned in a first direction upon application of a driving electric field across said liquid crystal layer; a second domain in which said liquid crystal molecules are aligned in a second, opposite direction upon application of said driving electric field across said liquid crystal layer; and a third domain extending between said first and second domains in the form of a band; said liquid crystal molecules tilting, in said third domain, in a direction perpendicular to both of said first and second directions when said driving electric field is applied across said liquid crystal layer, said method comprising the steps of:

(A) forming a first rubbing region and a second rubbing region on a first molecular alignment film provided on said first substrate, such that said first and second rubbing regions extend in the form of parallel bands in which said first and second rubbing regions are repeated alternately, and such that a first rubbing direction in said first rubbing region and a second rubbing direction in said second rubbing region are opposite to each other;

(B) forming a third rubbing region and a fourth rubbing region on a second molecular alignment film provided on said second substrate, such that said third and fourth rubbing regions extend in the form of parallel bands, such that said third and fourth rubbing regions are repeated alternately, and such that a third rubbing direction in said third rubbing region and a fourth rubbing direction in said fourth rubbing region are opposite from each other; and (C) assembling said first and second substrates together, such that said first molecular alignment film on said first substrate and said second molecular alignment film on said second substrate face each other, such that said first rubbing region and said third rubbing region generally overlap each other when viewed in a direction perpendicular to said first substrate, and such that said first rubbing direction and said third rubbing direction oppose each other;

wherein said step (C) includes a step of assembling said first and second substrates such that said first rubbing region and said fourth rubbing region overlap partially when viewed in said direction perpendicular to said first substrate.

According to the present invention, the first through third domains are formed in the liquid crystal layer with stability and reliability as a result of the control of the rubbing in the first and second molecular alignment films.

Another object of the present invention is to provide a method of fabricating a vertically aligned mode liquid crystal display device comprising a liquid crystal layer confined between first and second substrates, said liquid crystal layer including liquid crystal molecules aligning in a direction generally perpendicular to a principal surface of said first substrate when no substantial electric field is applied to said liquid crystal layer; said liquid crystal layer including: a first domain in which said liquid crystal molecules are aligned in a first direction upon application of a driving electric field across said liquid crystal layer; a second domain in which said liquid crystal molecules are aligned in a second, opposite direction upon application of said driving electric field across said liquid crystal layer; and a third domain extending between said first and second domains in the form of a band; said liquid crystal molecules tilting, in said third domain, in a direction perpendicular to both of said first and second directions when said driving electric field is applied across said liquid crystal layer, said method comprising the steps of:

(A) forming a first rubbing region and a second rubbing region in a first molecular alignment film provided on said first substrate alternately in the form of parallel bands, said first molecular alignment film being rubbed in a first direction, such that said first rubbing region causes a tilting in said liquid crystal molecules adjacent to said first rubbing region with a first tilt angle and such that said second rubbing region causes a tilting in said liquid crystal molecules adjacent to said second rubbing region with a second tilt angle smaller that said first tilt angle;

(B) forming a third rubbing region and a fourth rubbing region in a second molecular alignment film provided on said second substrate alternately in the form of parallel bands, said second molecular alignment film being rubbed in a second direction opposite to said first direction, such that said third rubbing region causes a tilting in said liquid crystal molecules adjacent to said third rubbing region with a third tilt angle and such that said fourth rubbing region causes a tilting in said liquid crystal molecules adjacent to said fourth rubbing region with a fourth tilt angle smaller than said third tilt angle;

(C) assembling said first and second substrates such that said first and second molecular alignment films face each other and such that said first rubbing region and said fourth rubbing region generally overlap with each other when viewed in a direction perpendicularly to a principal surface of said first substrate;

wherein said step (C) is conducted such that said first rubbing region and said third rubbing region overlap partially when viewed in said direction perpendicular to said principal surface of said first substrate.

According to the present invention, the first through third domains are formed in the liquid crystal layer with efficiently by choosing the material of the first and second molecular alignment films.

Other objects and further features of the present invention will become apparent from the following detailed description when read in conjunction with the attached drawings.

DETAILED DESCRIPTION OF THE PREFERRED EMBODIMENTS

[Principle]

First, the principle of the present invention will be described with reference to FIGS. 3A and 3B.

The inventor of the present invention has conducted a series of experiments in search of a domain structure that can exist stably in a VA-mode liquid crystal panel. Such an investigation included an observation of the molecular alignment pattern in a VA-mode liquid crystal panel in which no processing is made on the molecular alignment films for a particular direction of molecular alignment.

Figure 1A:
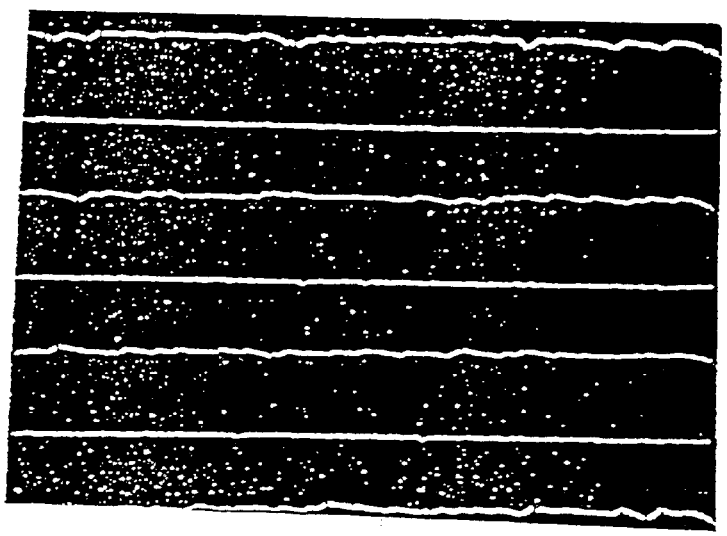
FIGS. 1A and 1B are diagrams showing the principle of divided molecular alignment construction in a conventional TN-mode liquid crystal display device.
Figure 1B:
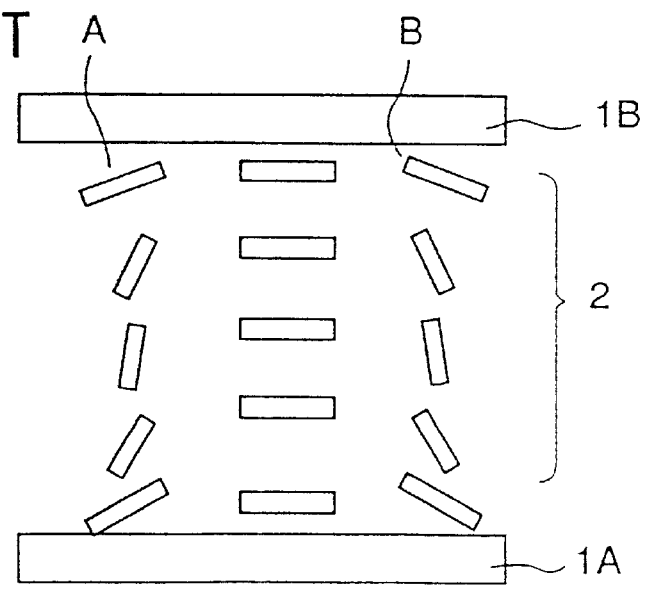
Figure 2:
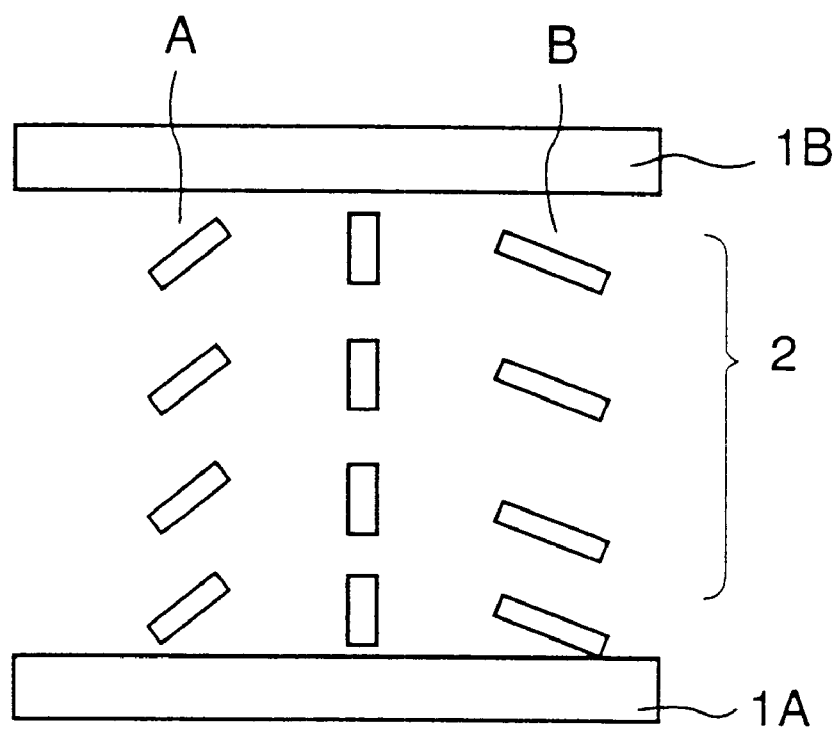
FIG. 2 is a diagram showing a hypothetical structure in which the divided molecular alignment construction of a TN-mode liquid crystal display device is applied straightforward to a VA-mode liquid crystal display device.
Figure 3B:
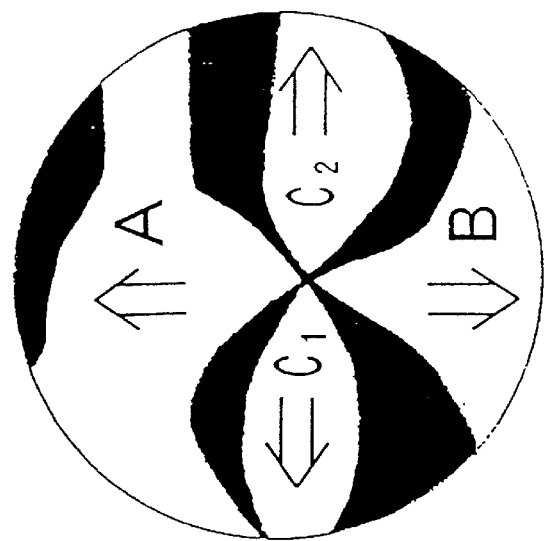
FIGS. 3A and 3B are diagrams showing a domain structure appearing spontaneously in a VA-mode liquid crystal panel.
Figure 3A:
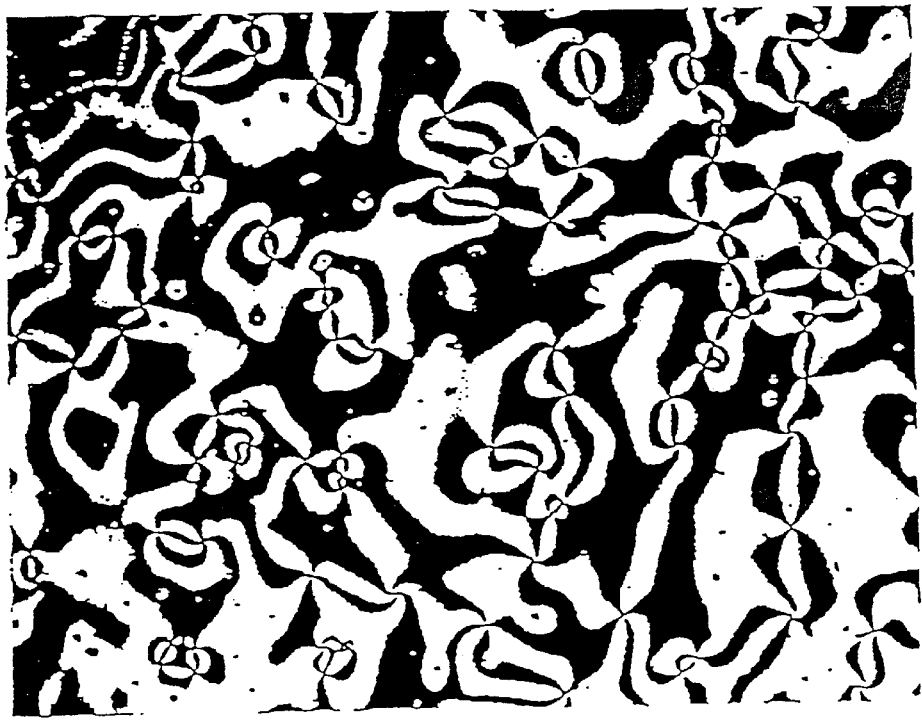

FIGS. 3A and 3B show an example of such a spontaneous molecular alignment pattern that is typically observed in a VA-mode liquid crystal panel in which no processing is made on the molecular alignment films, wherein FIG. 3A shows the overall view of the liquid crystal panel in a plan view while FIG. 3B shows a part of the liquid crystal panel in an enlarged scale. In FIGS. 3A and 3B, it should be noted that a driving electric field is applied across the liquid crystal layer, and a pair of polarizers are disposed above and below the liquid crystal layer with a crossed Nicol state.

Referring to FIGS. 3A and 3B, it can be seen that the liquid crystal molecules are tilted in random directions upon application of the driving electric field to the liquid crystal layer due to the absence of constraint on the direction of tilting of the liquid crystal molecules. In the enlarged view of FIG. 3B, it can be seen that there are domains A and B in the liquid crystal layer in which the liquid crystal molecules are tilted respectively in the upward direction and downward direction on the sheet of the drawing upon application of the driving electric field. Further, it should be noted that there exist micro-domains $C_1$ and $C_2$ interposed between the adjacent domains A and B, wherein the direction of tilting of the liquid crystal molecules in the micro-domain $C_1$ or micro-domain $C_2$ is perpendicular to any of the directions of tilting of the liquid crystal molecules in the domain A or domain B.

The foregoing discovery has lead to a conclusion that it is essentially important, when forming a divided alignment domain structure in a VA-mode liquid crystal display device, to provide an intervening micro-domain C between the domains A and B, in which the directions of tilting of the liquid crystal molecules and hence the view angle characteristic are different by 180°, such that the tilting direction, and hence the view angle characteristic, of the micro-domain C is different from that of any of the domains A and B by an angle of 90°.

Figure 4:
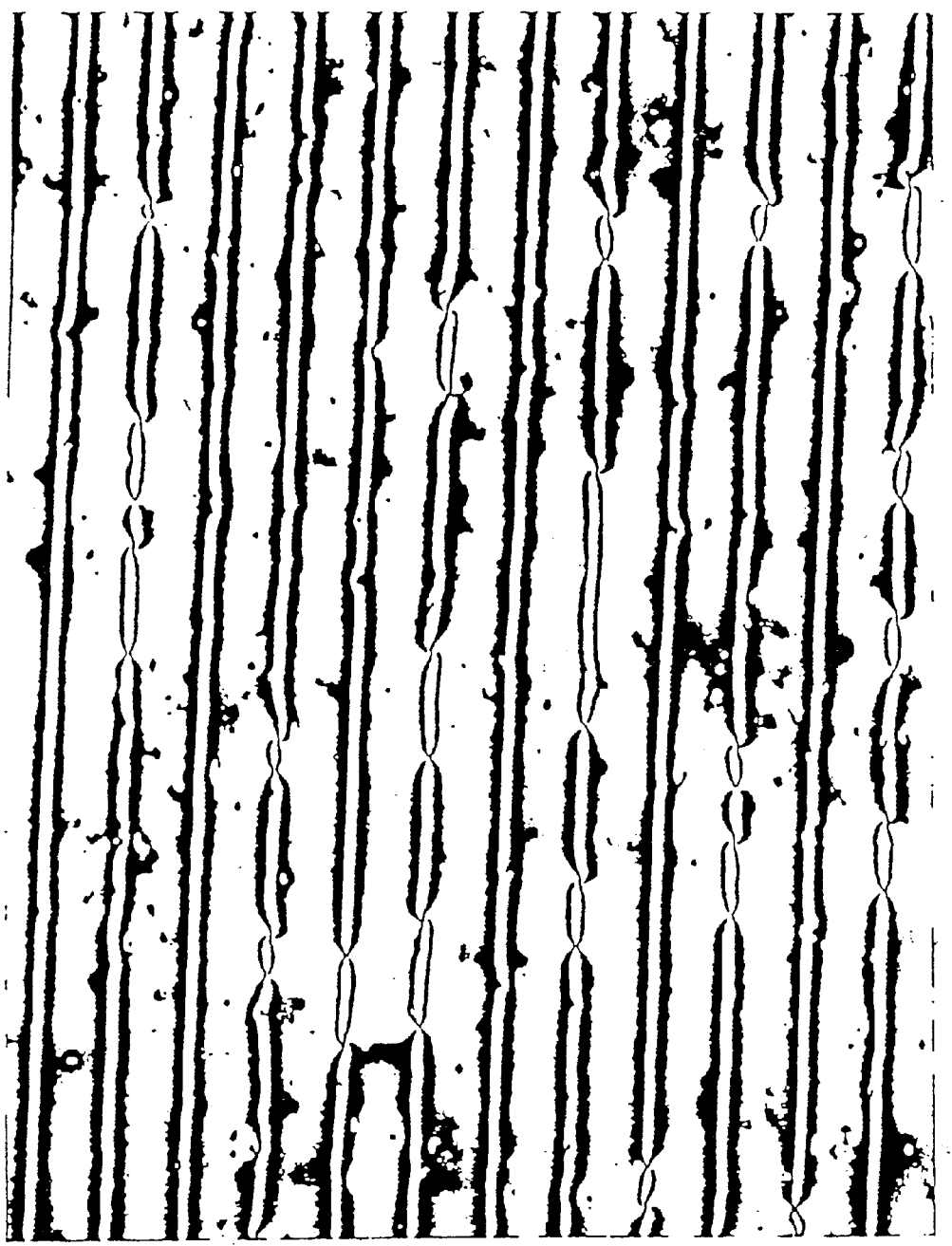
FIG. 4 is a diagram showing a stable domain structure appearing in a VA-mode liquid crystal display device of the present invention.
Figure 5:
FIG. 5 is a diagram corresponding to FIG. 4 and explaining the domain structure of FIG. 4.
Figure 5:
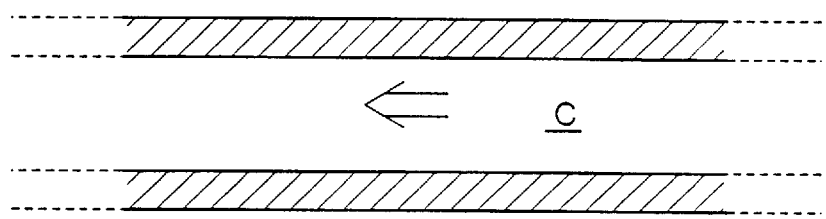
Figure 5:
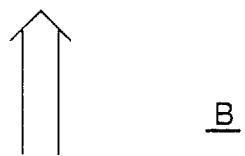
Figure 5:
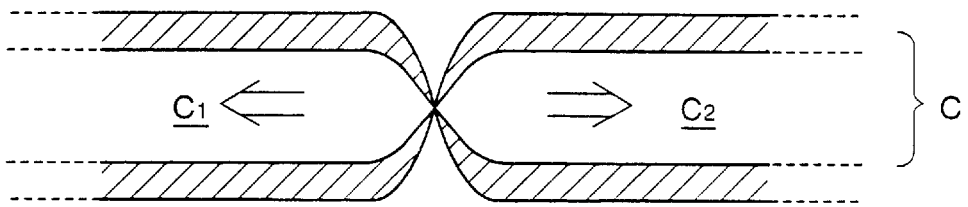
Figure 5:
Figure 5:
Figure 6:
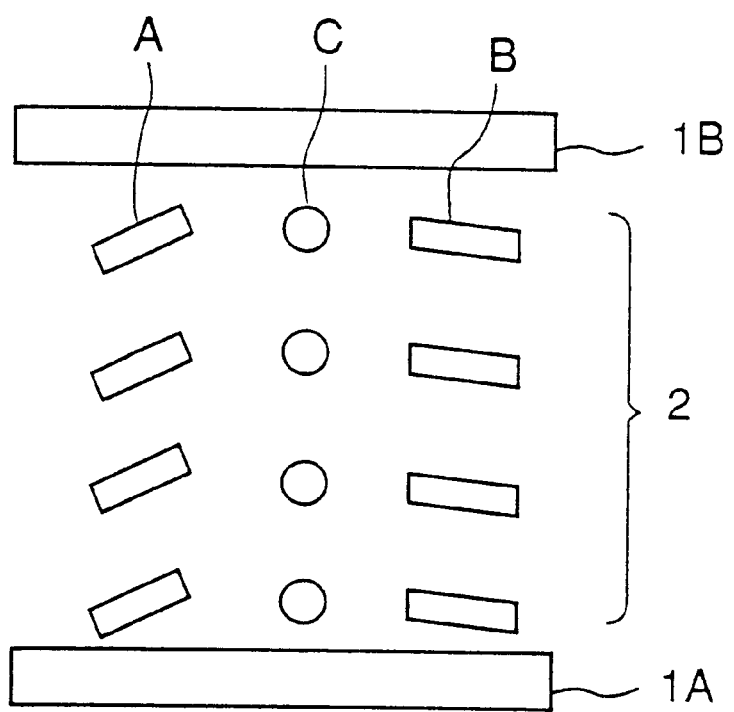
FIG. 6 is another diagram showing the cross-sectional view of the liquid crystal layer of FIG. 5.

Thus, the present invention forms a micro-domain C in the liquid crystal layer of a VA-mode liquid crystal panel in the form of a band such that the micro-domain C is interposed between a pair of principal domains A and B as indicated in FIGS. 4–6. The micro-domain C thus formed should have a view angle characteristic different from any of the view angle characteristics of the domains A and B by an angle of 90° as noted above.

It should be noted that FIG. 4 is a diagram similar to the diagram of FIG. 3A and shows the optical state of the liquid crystal layer in the activated state for a case in which the foregoing intervening micro-domain C is formed between the domains A and B in the form of a band, while FIG. 5 shows the domain structure formed in FIG. 4 more schematically for facilitating understanding. In FIG. 5, the direction of tilting of the liquid crystal molecules upon application of the driving electric field is represented by arrows. Further, FIG. 6 shows the liquid crystal panel in a cross sectional view. In FIG. 6, those parts corresponding to the parts described previously are designated by the same reference numerals and the description thereof will be omitted.

Thus, it was experimentally confirmed that a divided alignment domain structure is successfully formed in the liquid crystal layer of a VA-mode liquid crystal panel reliably and stably, by forming the intervening micro-domain C between the principal domains A and B as is predicted by the result of FIGS. 3A and 3B. The micro-domain C may be divided into domains $C_1$ and $C_2$ as indicated in FIG. 5. Because of the existence of domains having different view angle characteristics, the VA-mode liquid crystal display device of the present invention shows an excellent overall view angle characteristic.

In another aspect of the present invention, the inventor of the present invention further discovered that the VA-mode liquid crystal display device having the foregoing divided alignment domain structure shows a significantly improved ON/OFF response speed.

Figure 7A:
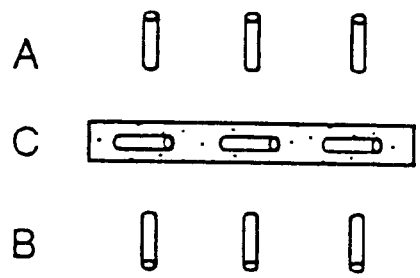
FIGS. 7A–7C are diagrams showing the tilting of the liquid crystal molecules in various VA-mode liquid crystal display devices including the liquid crystal display device of the present invention.
Figure 7B:
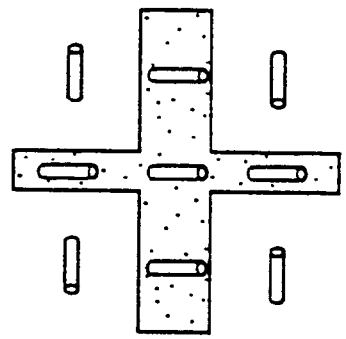
Figure 7C:
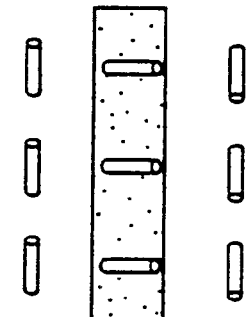

More specifically, the inventor of the present invention has discovered, in the experiments conducted on various VA-mode liquid crystal panels having the domain structures shown in FIGS. 7A–7C, that the liquid crystal panel of FIG. 7A shows a turn-on time $T_{ON}$ of about 8 ms, while the liquid crystal panel of FIG. 7C shows a turn-on time $T_{ON}$ of about 200 ms. Further, the liquid crystal panel of FIG. 7B shows an intermediate turn-on time $T_{ON}$ of about 42 ms. The turn-off time $T_{OFF}$ was about 5 ms for all of the liquid crystal panels of FIGS. 7A–7C. It should be noted that the turn-on time $T_{ON}$ is a time needed for a liquid crystal display device to increase the transmittance to a 90% transmittance state starting from a zero transmittance state upon application of a driving electric field to the liquid crystal layer, while the turn-off time $T_{OFF}$ is a time needed for a liquid crystal display device to reduce the transmittance from a 100% transmittance state to a 10% transmittance state upon deenergization of the driving electric field. Further, it should be noted that the domain structure of FIG. 7A corresponds to the domain structure of FIGS. 4 and 5. FIGS. 7A–7C show the liquid crystal display panel in the activated state.

The foregoing result is interpreted as follows.

In the construction of FIG. 7C, the liquid crystal molecules in the micro-domain C are aligned perpendicularly to the elongating direction of the band-like micro-domain C. In other words, the major axis of the liquid crystal molecules is tilted in the width direction of the band-like micro-domain C. In contrast, the liquid crystal molecules in the micro-domain C of the construction of FIG. 7A are aligned in the elongating direction of the band-like micro-domain C. Thereby, the tilting of the liquid crystal molecules is much more easier in the domain structure of FIG. 7A than in the domain structure of FIG. 7C. In the case of FIG. 7C, the energy needed for tilting the liquid crystal molecules should be much larger than the energy needed in the case of FIG. 7A in view of interference with adjacent domains.

Figure 8A:
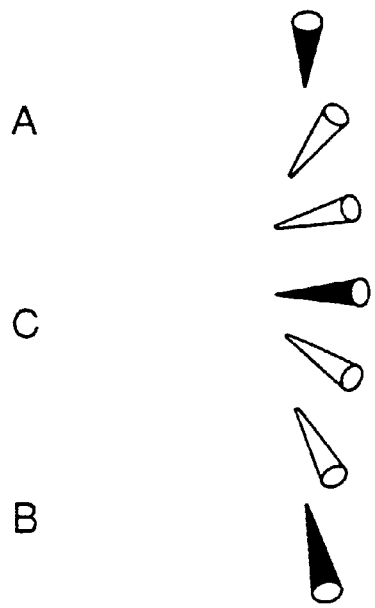
FIGS. 8A and 8B are diagrams showing the alignment of the liquid crystal molecules in some of the VA-mode liquid crystal display devices of FIGS. 7A–7C, including the VA-mode liquid crystal display device of the present invention.
Figure 8B:
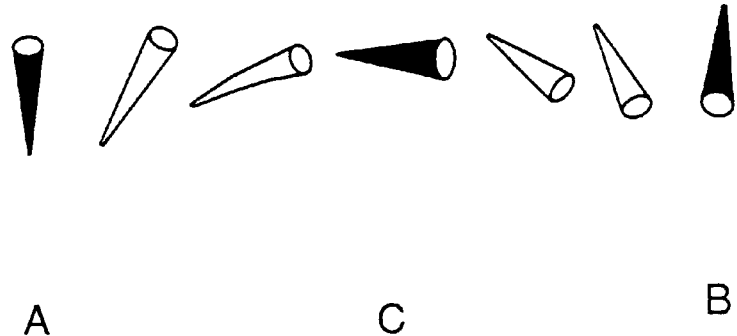

FIGS. 8A and 8B show the details of the structures of FIGS. 7A and 7C respectively in a cross-sectional view taken along a line crossing the domains A, C and B consecutively, wherein FIG. 8A shows those liquid crystal molecules represented in FIG. 7A by solid cones. Similarly, FIG. 8B shows the liquid crystal molecules of FIG. 7C by the solid cones.

Referring to FIGS. 8A and 8B, it should be noted that there is formed a so-called spray structure in the liquid crystal layer of FIG. 7A as indicated in the cross-sectional view of FIG. 8A, while a so-called bend structure is formed in the liquid crystal layer of FIG. 7C as indicated in FIG. 8B. Since a spray structure generally has smaller elastic constants as compared with a bend structure, the foregoing fast response speed of the domain construction of FIG. 7A is explained also in view point of the elastic nature of the liquid crystal layer.

Thus, the present invention achieves both a superior view angle and a fast response speed in a VA-mode liquid crystal display device, by controlling the domain structure in the liquid crystal layer as indicated in FIG. 4 or 5. In order to achieve the domain structure of FIG. 4 or 5 reliably and with reproducibility, it is necessary to reduce the width of the intervening micro-domain C as compared with the principal domains A and B. On the other hand, in view of the stability of the domain structure, it is desired that the width of the micro-domain C is larger than the thickness of the liquid crystal layer.

As already noted, the micro-domain C contributes also to the improvement of the view angle characteristics of the liquid crystal display device. In this view point, the existence of the micro-domains $C_1$ and $C_2$ indicated in FIG. 5 is a preferable feature.

[First Embodiment]

Figure 9A:
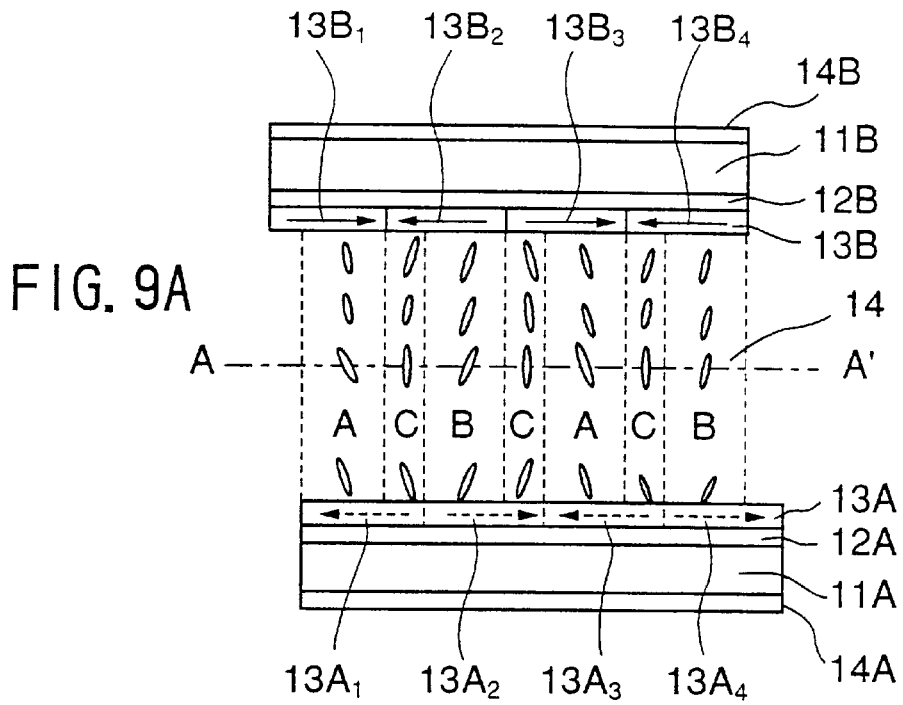
FIGS. 9A and 9B are diagrams showing the construction of a liquid crystal display device according to a first embodiment of the present invention respectively in a non-activated state and in an activated state.
Figure 9B:
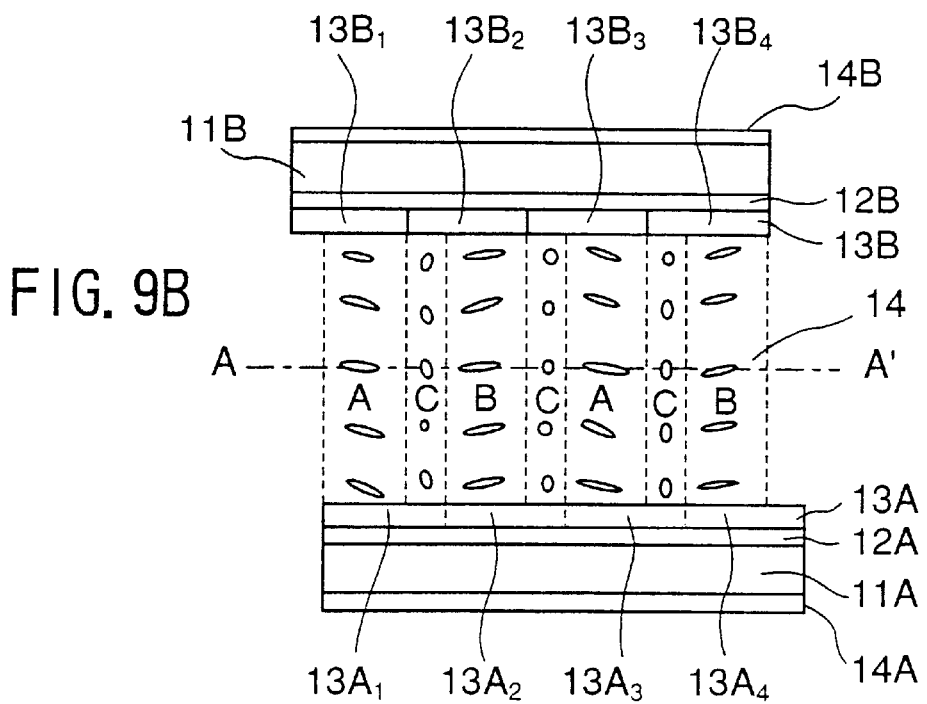

FIGS. 9A and 9B are diagrams showing a liquid crystal display device according to a first embodiment of the present invention respectively in a non-activated state and an activated state.

Referring to FIGS. 9A and 9B, the liquid crystal display device basically includes a pair of glass substrates 11A and 11B and a liquid crystal layer 14 having a negative dielectric anisotropy is confined between the glass substrates 11A and 11B. The glass substrate 11A carries thereon a drive electrode 12A, and a molecular alignment layer 13A is provided on the glass substrate 11A so as to cover the drive electrode 12A and for contact with the liquid crystal layer 14. Similarly, the glass substrate 11B carries thereon a drive electrode 12B, and a molecular alignment layer 13B is provided on the glass substrate 11B so as to cover the drive electrode 12B and for contact with the liquid crystal layer 14. Further, a polarizer 14A is disposed at the outer side of the substrate 11A opposite to the side of the liquid crystal layer 14, and an analyzer 14B is disposed at the outer side of the substrate 11B opposite to the side of the liquid crystal layer 14. The polarizer 14A and the analyzer 14B are disposed in a crossed Nicol state as usual.

In the non-activated state of FIG. 9A, the liquid crystal molecules in the liquid crystal layer 14 are aligned generally perpendicularly to the principal surface of the substrate 11A or 11B, and the optical beam incident to the substrate 11A through the polarizer 14A passes through the liquid crystal layer 14 without rotating the polarization plane thereof. Thereby, the optical beam is shut substantially completely by the analyzer 14B disposed in the crossed Nicol state to the polarizer 14A.

In the activated state of FIG. 9B, on the other hand, the liquid crystal molecules are aligned generally horizontally in the liquid crystal layer 14 due to the driving electric field formed by the electrodes 13A and 13B. Thereby, the optical beam incident to the liquid crystal layer 14 through the polarizer 14A experiences a rotation of the polarization plane as it travels therethrough and exits through the analyzer 14B without being interrupted.

In the liquid crystal display device of the present embodiment, the molecular alignment layer 13A is divided into a plurality of regions $13A_1$, $13A_2$, $13A_3$ and $13A_4$ wherein the rubbing direction is reversed alternately in the regions $13A_1$, $13A_2$, $13A_3$ and $13A_4$. Similarly, the molecular alignment layer 13B is divided into a plurality of regions $13B_1$, $13B_2$, $13B_3$ and $13B_4$ wherein the rubbing direction is reversed alternately in the regions $13B_1$, $13B_2$, $13B_3$ and $13B_4$. Thereby, the substrates 11A and 11B are disposed such that the region $13A_1$ in the molecular alignment layer 13A faces the region $13B_1$ in the molecular alignment layer 13B and such that the region $13A_2$ in the molecular alignment layer 13A faces the region $13B_2$ in the molecular alignment layer 13B. Thereby, the rubbing direction in the region $13A_1$ and the rubbing direction in the region $13B_1$ are opposite to each other (anti-parallel relationship), and a zero twist angle is formed for the liquid crystal molecules in the liquid crystal layer 14. This, however, is not an imperative condition and the liquid crystal molecules may form any twist angle in the range between 0° and 180°.

In the embodiment of FIGS. 9A and 9B, it should be noted further that the substrates 11A and 11B are displaced to each other such that a part of the region $13A_1$ faces a part of the region $13B_2$. Similarly, a part of the region $13A_2$ faces a part of the region $13B_3$.

Figure 10A:
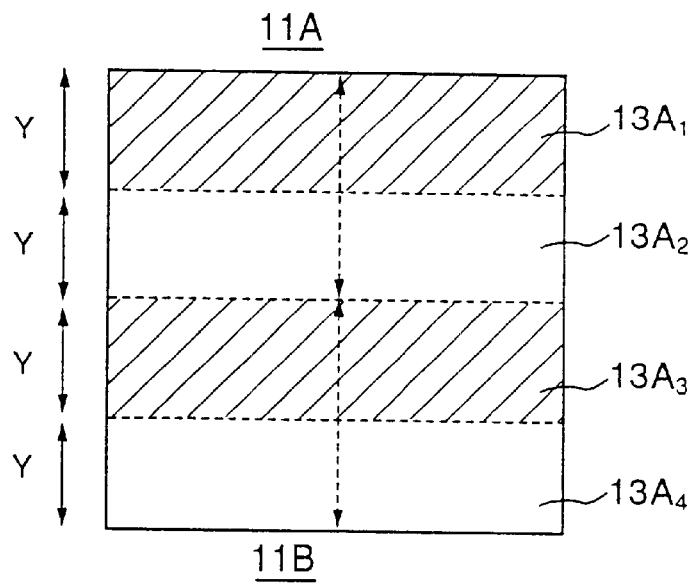
FIGS. 10A–10C are diagrams showing details of the liquid crystal display device of the first embodiment.
Figure 10B:
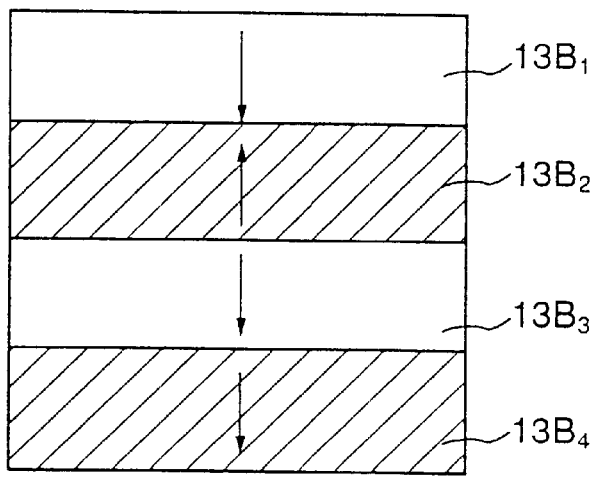
Figure 10C:
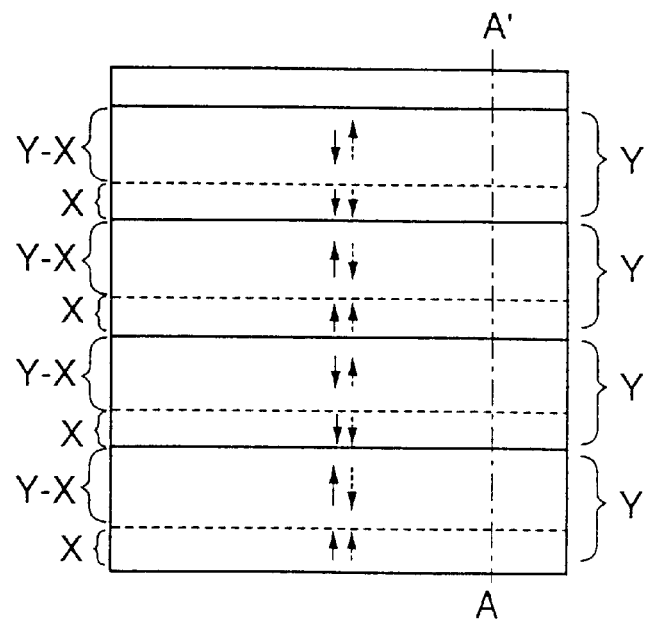

FIGS. 10A–10C explain the foregoing assembling of the substrates 11A and 11B.

Referring to FIG. 10A, the molecular alignment layer 13A on the substrate 11A is divided into a plurality of parallel, band-like regions each having a width Y and corresponding to the foregoing rubbing regions $13A_1$–$13A_4$. Similarly, the molecular alignment layer 13B on the substrate 11B is divided into a plurality of parallel, band-like regions each having the width Y and corresponding to the foregoing rubbing regions $13B_1$–$13B_4$. See FIG. 10B.

Thereby, the substrates 11A and 11B are assembled such that the regions $13A_1$ and $13B_2$ overlap partially with a width X as indicated in FIG. 10C, wherein the overlap-free regions thus formed and designated in FIG. 10C by Y-X correspond to the domains A and B of FIG. 5. Further, the band-like region X corresponds to the micro-domain C.

As noted already with reference to FIGS. 9A and 9B, the rubbing direction is anti-parallel in the principal domain A as well as in the principal domain B, and the liquid crystal molecules show a zero twist angle in the domains A and B. In the micro-domain C, on the other hand, the rubbing direction is parallel and the liquid crystal molecules show a 180° twist angle. The micro-domain C may be divided further into sub-domains $C_1$ and $C_2$ as noted already. It should be noted that the cross-sectional diagrams of FIGS. 9A and 9B are taken along a line A–A' of FIG. 10C.

Referring back to FIGS. 9A and 9B, it should be noted that the liquid crystal molecules are tilted in the opposite directions in the domain A and in the domain B in the activated state of FIG. 9B as explained already with reference to FIG. 5, while the liquid crystal molecules in the micro-domain C are tilted in a direction perpendicular to any of the tilting directions in the domain A and in the domain B. Thus, the liquid crystal display device of the present embodiment shows a very fast ON/OFF transient response.

FIGS. 11A–11D show the fabrication process of the liquid crystal display device of FIGS. 9A and 9B, wherein those parts corresponding to the parts described previously are designated by the same reference numerals and the description thereof will be omitted.

Figure 11A:
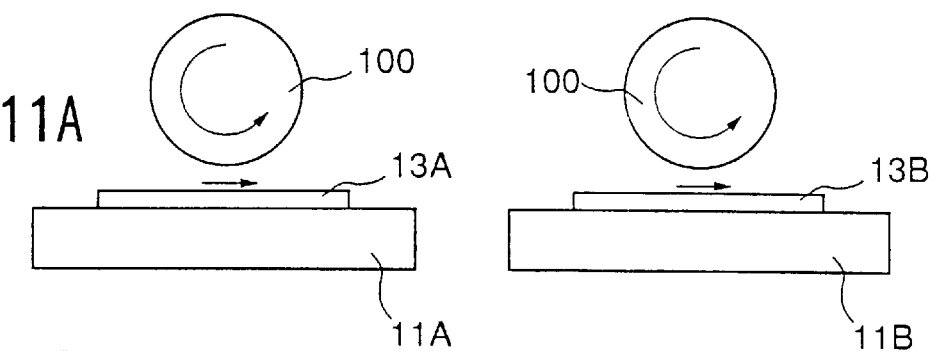
FIGS. 11A–11D are diagrams showing a fabrication process of the liquid crystal display device of the first embodiment.

Referring to FIG. 11A, the molecular alignment layer 13A on the substrate 11A is rubbed by a rubbing roller 100 in a direction indicated by an arrow. Similarly, the molecular alignment layer 13B on the substrate 11B is rubbed by the rubbing roller 100 in the same direction.

Figure 11B:
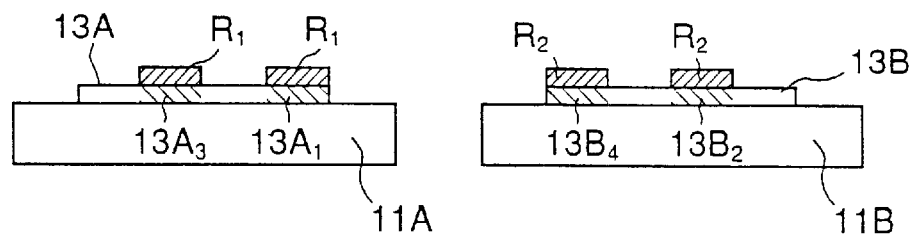

Next, in the step of FIG. 11B, a band-like resist pattern $R_1$ is provided on the molecular alignment layer 13A so as to cover the regions $13A_1$ and $13A_3$. Similarly, a band-like resist pattern $R_2$ is provided on the molecular alignment layer 13B so as to cover the regions $13B_2$ and $13B_4$.

Figure 11C:
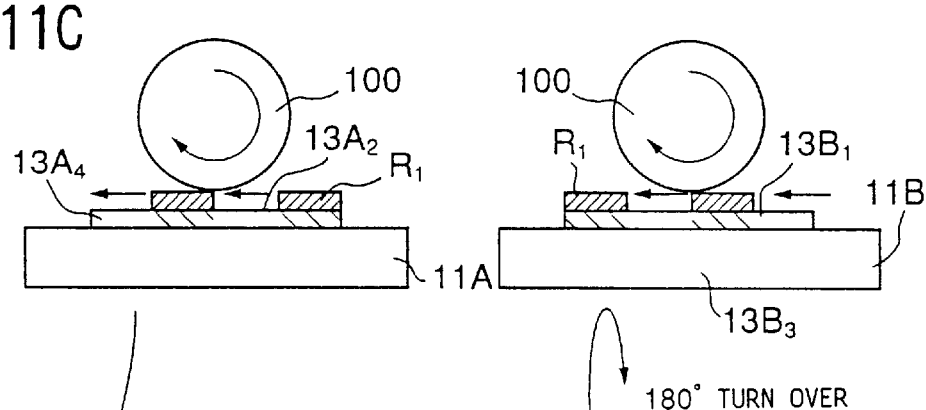

Next, in the step of FIG. 11C, the molecular alignment layers 13A and 13B thus masked by the resist patterns $R_1$ and $R_2$ are then subjected to a rubbing process conducted by the rubbing roller 100, wherein the rubbing roller 100 now processes the exposed regions of the molecular alignment layers 13A and 13B in a direction opposite to the rubbing direction used in the step of FIG. 11A. Thereby, the exposed regions $13A_2$ and $13A_4$ of the molecular alignment layer 13A are rubbed oppositely to the rubbing regions $13A_1$ and $13A_3$. Similarly, the exposed regions $13B_1$ and $13B_3$ of the molecular alignment layer 13B are rubbed oppositely to the rubbing regions $13B_2$ and $13B_4$.

Figure 11D:
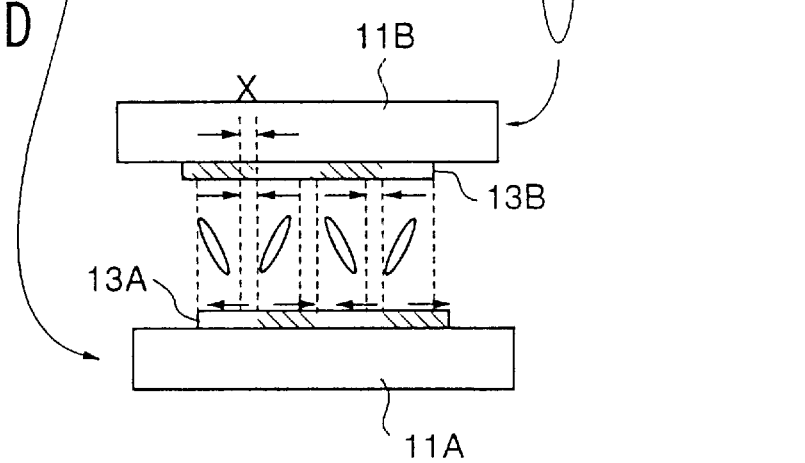

The substrates 11A and 11B are then assembled in the step of FIG. 11D with a lateral offset X between the substrates 11A and 11B as noted already, and the liquid crystal layer 14 is confined into a gap thus formed between the substrates 11A and 11B.

[Second Embodiment]

Figure 12:
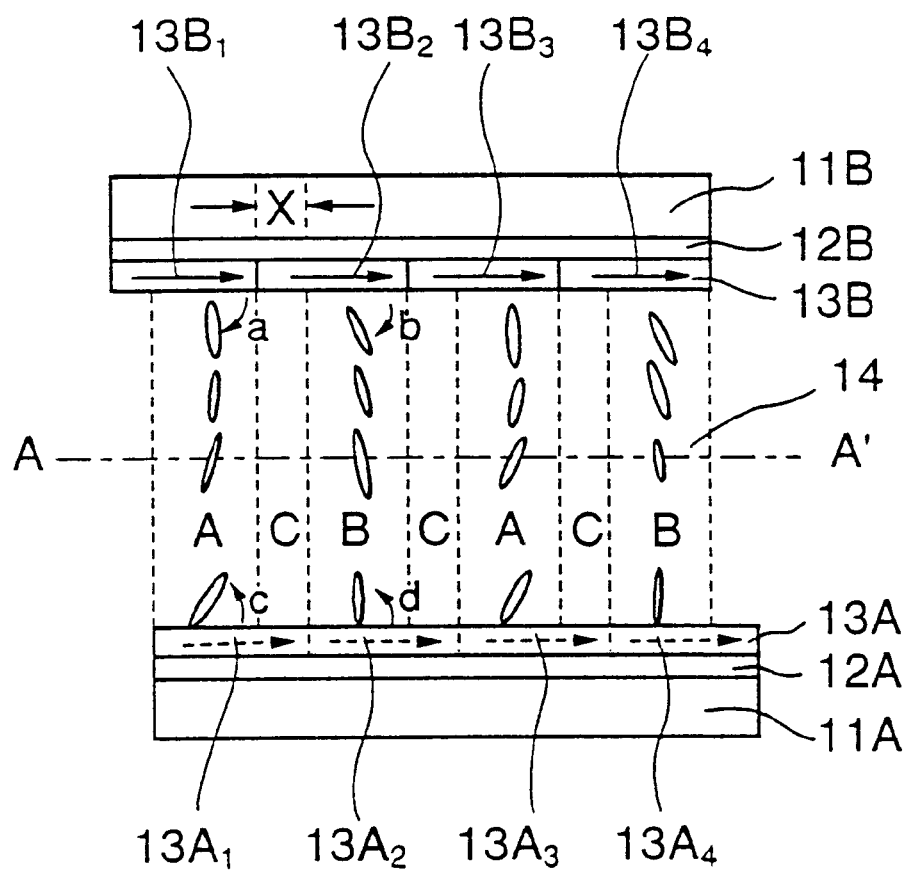
FIG. 12 is a diagram showing the construction of a liquid crystal display device according to a second embodiment of the present invention.

FIG. 12 shows the construction of a VA-mode liquid crystal display device according to a second embodiment of the present invention, wherein those parts corresponding to the parts described previously are designated by the same reference numerals and the description thereof will be omitted.

Referring to FIG. 12, the molecular alignment layers 13A and 13B are rubbed in the same direction, and thus, the regions $13A_1$–$13A_4$ on the molecular alignment layer 13A are rubbed in a common direction. Further, the regions $13B_1$–$13B_4$ on the molecular alignment layer 13B are rubbed in a common direction.

In the present embodiment, the pre-tilt angle c of the liquid crystal molecules in the regions $13A_1$ and $13A_3$ is set smaller than the pre-tilt angle d of the liquid crystal molecules in the regions $13A_2$ and $13A_4$. Similarly, the pre-tilt angle b of the liquid crystal molecules in the regions $13B_2$ and $13B_4$ is set smaller than the pre-tilt angle a of the liquid crystal molecules in the regions $13B_1$ and $13B_3$.

By disposing the molecular alignment layers 13A and 13B thus processed similarly to the previous embodiment such that the molecular alignment layer 13A is displaced with respect to the molecular alignment layer 13B by an offset X, the domains A and B as well as the micro-domain C are formed in the liquid crystal layer 14 similarly. The micro-domain C may be divided further into sub-domains $C_1$ and $C_2$. It should be noted that the pre-tilt angle a of the region $13B_1$ facing the region $13A_1$ is larger than the pre-tilt angle c of the region $13A_1$ ($|a|>|c|$) and that the pre-tilt angle b of the region $13B_2$ is smaller than the pre-tilt angle d of the region $13A_2$ that cases the region $13B_2$ ($|b|<|d|$).

Thus, the liquid crystal display device of the present embodiment also includes the domains A and B in the liquid crystal layer 14, and the view angle characteristic of the device is improved substantially. As the liquid crystal display device of the present embodiment includes the micro-domain C between the domains A and B, the divided domain structure thus formed appears stably and with reproducibility. Further, the liquid crystal display device having such a domain structure shows an excellent response.

Figure 13A:
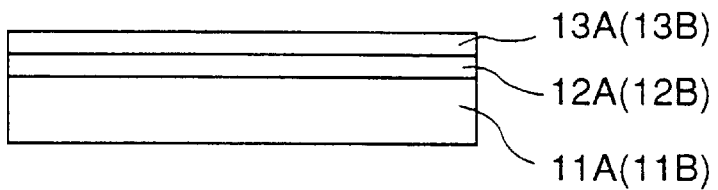
FIGS. 13A–13C are diagrams showing a fabrication process of the liquid crystal display device of the second embodiment.
Figure 13B:
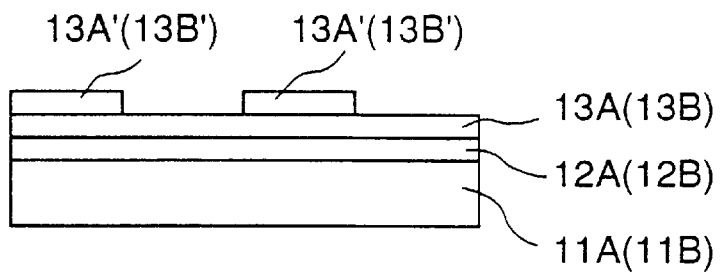
Figure 13C:
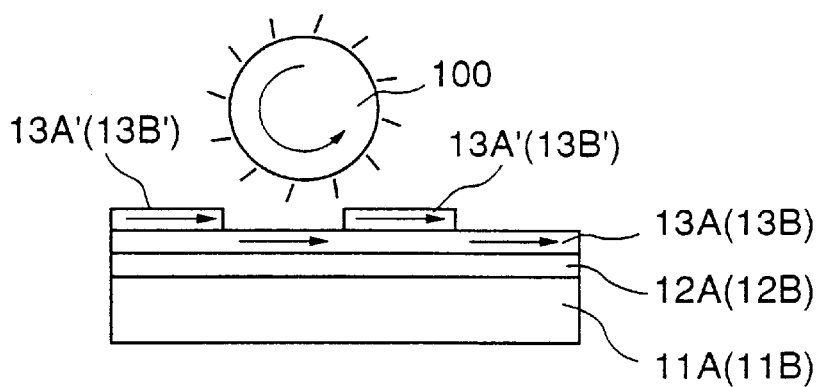

FIGS. 13A–13C show the process of fabricating the liquid crystal display device of FIG. 12, wherein those parts corresponding to the parts described previously are designated by the same reference numerals and the description thereof will be omitted.

Referring to FIG. 13A, the electrode 12A is formed on the substrate 11A, and the molecular alignment layer 13A is provided on the substrate 11A such that the molecular alignment layer 13A covers the electrode 12A, wherein the molecular alignment layer 13A provides the pre-tilt angle c for the liquid crystal molecules in the liquid crystal layer 14 contacting with the molecular alignment layer 13A.

Next, in the step of FIG. 13B, a molecular alignment pattern 13A' is provided on the molecular alignment layer 13A in correspondence to the foregoing regions $13A_2$ and $13A_4$ by a screen printing process, wherein the molecular alignment pattern 13A' causes an alignment of the liquid crystal molecules with the pre-tilt angle d. For example, EXP004 of Nissan Chemicals may be used for the molecular alignment layer 13A and RN783 of Nissan Chemicals may be used for the molecular alignment pattern 13A'.

After the molecular alignment pattern 13A' is thus formed, the rubbing roller 100 is applied on the structure of FIG. 13B, and the molecular alignment pattern 13A' as well as the molecular alignment layer 13A are rubbed by the rubbing roller 100 as indicated in FIG. 13C.

The substrate 11B is processed similarly, and the substrates 11A and 11B thus processed are assembled with a lateral offset X as explained already, such that the pattern 13A' on the substrate 11A partially faces the pattern 13B' on the substrate 11B. After filling the gap between the substrates 11A and 11B by the liquid crystal layer 14, the liquid crystal display device of FIG. 12 is obtained.

Figure 14A:
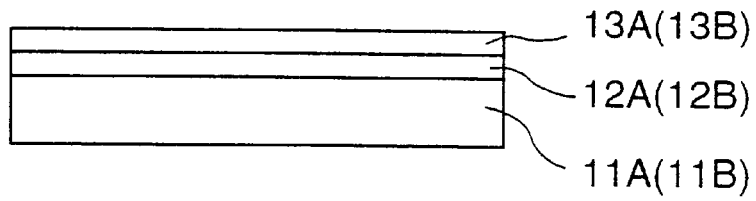
FIGS. 14A–14C are diagrams showing another fabrication process of the liquid crystal display device of the second embodiment.
Figure 14B:
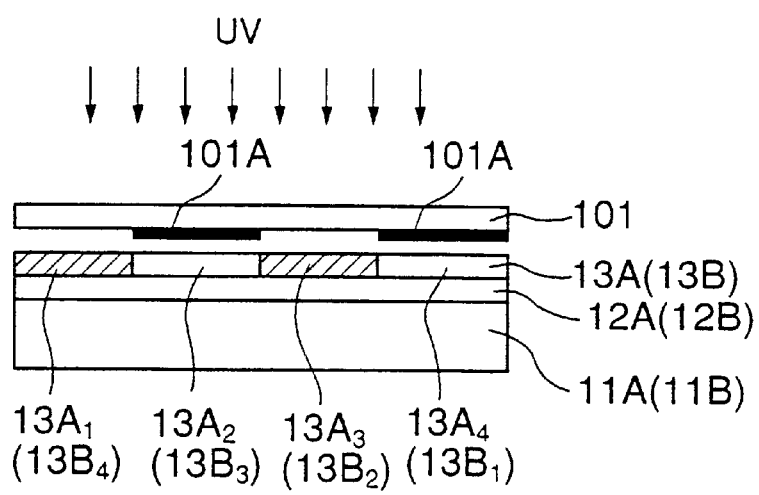
Figure 14C:
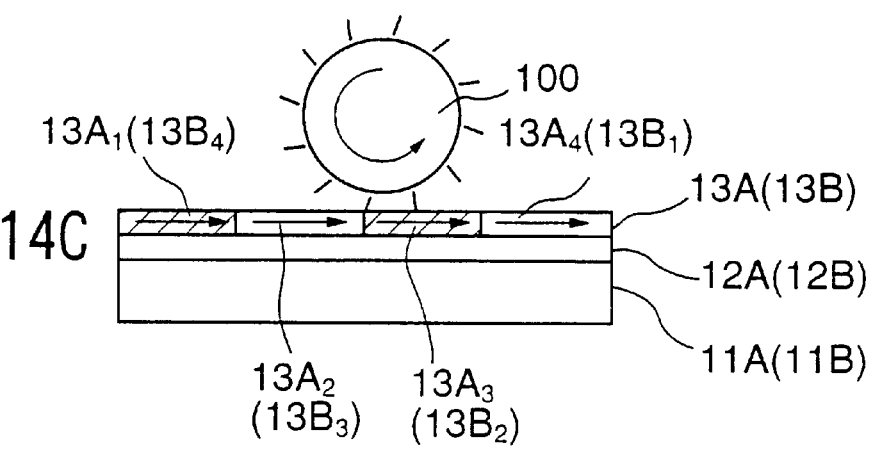

FIGS. 14A–14C are diagrams showing another fabrication process of the liquid crystal display device of FIG. 12.

Referring to FIG. 14A, the molecular alignment layer 13A is formed on the substrate 11A such that the molecular alignment layer 13A covers the electrode 12A on the substrate 11A, and the molecular alignment layer 13A is subjected to an ultraviolet exposure process in the step of FIG. 14B conducted through a photomask 101, wherein it should be noted that the photomask 101 carries thereon opaque patterns 101A in correspondence to the regions $13A_2$ and $13A_4$. Thereby, only the part of the molecular alignment layer 13A corresponding to the regions $13A_1$ and $13A_3$ is exposed to the ultraviolet radiation, and the pre-tilt angle of the exposed regions $13A_1$ and $13A_3$ is changed with respect to the pre-tilt angle of the unexposed regions $13A_2$ and $13A_4$.

Next, in the step of FIG. 14C, the molecular alignment layer 13A is subjected to a uniform rubbing process conducted by the rubbing roller 100.

A similar exposure and rubbing process is applied also to the molecular alignment layer 13B on the substrate 11B, and the substrates 11A and 11B thus processed are assembled with an offset X similarly as before. Thereby, a VA-mode liquid crystal display device functionally equivalent to the liquid crystal display device of FIG. 12 is obtained.

Further, the present invention is not limited to the embodiments described heretofore, but various variations and modifications may be made without departing from the scope of the invention.

What is claimed is:

1. A vertically aligned liquid crystal display device, comprising:

a first substrate;

a second substrate substantially parallel to said first substrate;

a liquid crystal layer confined between said first and second substrates and including liquid crystal molecules aligning in a direction generally perpendicular to a principal surface of said first substrate when no substantial electric field is applied to said liquid crystal layer;

a first driving electrode provided on said first substrate; and a second driving electrode provided on said second substrate;

said liquid crystal layer including: a first domain in which said liquid crystal molecules are aligned in a first direction upon application of a driving electric field across said liquid crystal layer; a second domain in which said liquid crystal molecules are aligned in a second, opposite direction upon application of said driving electric field across said liquid crystal layer; and a third domain extending between said first and second domains in the form of a band, wherein said liquid crystal molecules tilt, in said third domain, in a direction perpendicular to both of said first and second directions when said driving electric field is applied across said liquid crystal layer.

2. A vertically aligned liquid crystal display device as claimed in claim 1, wherein said third domain forms an elongating strip, and said liquid crystal molecules in said third domain are aligned generally in an elongating direction of said third domain.

3. A vertically aligned liquid crystal display device as claimed in claim 1, wherein said liquid crystal molecules in said third domain are tilted generally in a third direction perpendicular to any of said first and second directions in response to an application of a driving electric field to said liquid crystal layer.

4. A vertically aligned liquid crystal display device as claimed in claim 1, wherein said third domain includes a first sub-domain in which said liquid crystal molecules are tilted in a third direction perpendicular to any of said first and second directions in response to an application of a driving electric field to said liquid crystal layer and a second sub-domain in which said liquid crystal molecules are tilted in a fourth direction opposite to said third direction in response to said application of said driving electric field to said liquid crystal layer.

5. A vertically aligned liquid crystal display device as claimed in claim 1, wherein said third domain has a width larger than a thickness of said liquid crystal layer.

6. A vertically aligned liquid crystal display device as claimed in claim 5, wherein said width is smaller than any of a width of said first domain and a width of said second domain.

7. A vertically aligned liquid crystal display device as claimed in claim 1, wherein each of said first and second substrates carries thereon a molecular alignment layer, said molecular alignment layer including first and second rubbing regions respectively having first and second, mutually opposite rubbing directions, such that said first and second rubbing regions are disposed alternately in said molecular alignment layer, said first and second substrates being assembled such that said first rubbing region on said first substrate faces both of said first and second rubbing regions on said second substrate and such that said second rubbing region on said first substrate faces both of said first and second rubbing regions on said second substrate.

8. A vertically aligned liquid crystal display device as claimed in claim 7, wherein said first and second domains have an identical width, and each of said first and second rubbing regions has a width of said first domain added with a width of said third domain.

9. A vertically aligned liquid crystal display device as claimed in claim 1, wherein each of said first and second substrates carries thereon a molecular alignment layer, said molecular alignment layer including first and second regions respectively providing first and second, smaller pre-tilt angles to said liquid crystal molecules contacting therewith, such that said first and second regions are disposed alternately in said molecular alignment layer, said first and second substrates being assembled such that said first region on said first substrate faces both of said first and second regions on said second substrate and such that said second region on said first substrate faces both of said first and second regions on said second substrate.

10. A vertically aligned liquid crystal display device as claimed in claim 9, wherein said first and second domains have an identical width, and each of said first and second regions has a width of said first domain added with a width of said third domain.

11. A vertically aligned liquid crystal display device as claimed in claim 1, wherein said liquid crystal molecules form a twist angle within a range of 0–180° in said liquid crystal layer.

12. A method of fabricating a vertically aligned mode liquid crystal display device comprising a liquid crystal layer confined between first and second substrates, said liquid crystal layer including liquid crystal molecules aligning in a direction generally perpendicular to a principal surface of said first substrate when no substantial electric field is applied to said liquid crystal layer; said liquid crystal layer including: a first domain in which said liquid crystal molecules are aligned in a first direction upon application of a driving electric field across said liquid crystal layer; a second domain in which said liquid crystal molecules are aligned in a second, opposite direction upon application of said driving electric field across said liquid crystal layer; and a third domain extending between said first and second domains in the form of a band; said liquid crystal molecules tilting, in said third domain, in a direction perpendicular to both of said first and second directions when said driving electric field is applied across said liquid crystal layer, said method comprising the steps of:

(A) forming a first rubbing region and a second rubbing region on a first molecular alignment film provided on said first substrate, such that said first and second rubbing regions extend in the form of parallel bands in which said first and second rubbing regions are repeated alternately, and such that a first rubbing direction in said first rubbing region and a second rubbing direction in said second rubbing region are opposite to each other;

(B) forming a third rubbing region and a fourth rubbing region on a second molecular alignment film provided on said second substrate, such that said third and fourth rubbing regions extend in the form of parallel bands, such that said third and fourth rubbing regions are repeated alternately, and such that a third rubbing direction in said third rubbing region and a fourth rubbing direction in said fourth rubbing region are opposite from each other; and (C) assembling said first and second substrates together, such that said first molecular alignment film on said first substrate and said second molecular alignment film on said second substrate face each other, such that said first rubbing region and said third rubbing region generally overlap each other when viewed in a direction perpendicular to said first substrate, and such that said first rubbing direction and said third rubbing direction oppose each other;

wherein said step (C) includes a step of assembling said first and second substrates such that said first rubbing region and said fourth rubbing region overlap partially when viewed in said direction perpendicular to said first substrate.

13. A method as claimed in claim 12, wherein said step (A) includes the steps of: rubbing said first molecular alignment film uniformly in said first rubbing direction on said first substrate; protecting a part of said first molecular alignment film corresponding to said first rubbing region by a first resist pattern; and rubbing said first molecular alignment film thus provided with said first resist pattern uniformly in said second rubbing direction; and wherein said step (B) includes the steps of: rubbing said second molecular alignment film uniformly in said third rubbing direction on said second substrate; protecting a part of said second molecular alignment film corresponding to said third rubbing region by a second resist pattern; and rubbing said second molecular alignment film thus provided with said second resist pattern uniformly in said fourth rubbing direction.

14. A method of fabricating a vertically aligned mode liquid crystal display device comprising a liquid crystal layer confined between first and second substrates, said liquid crystal layer including liquid crystal molecules aligning in a direction generally perpendicular to a principal surface of said first substrate when no substantial electric field is applied to said liquid crystal layer; said liquid crystal layer including: a first domain in which said liquid crystal molecules are aligned in a first direction upon application of a driving electric field across said liquid crystal layer; a second domain in which said liquid crystal molecules are aligned in a second, opposite direction upon application of said driving electric field across said liquid crystal layer; and a third domain extending between said first and second domains in the form of a band; said liquid crystal molecules tilting, in said third domain, in a direction perpendicular to both of said first and second directions when said driving electric field is applied across said liquid crystal layer, said method comprising the steps of:

(A) forming a first rubbing region and a second rubbing region in a first molecular alignment film provided on said first substrate alternately in the form of parallel bands, said first molecular alignment film being rubbed in a first direction, such that said first rubbing region causes a tilting in said liquid crystal molecules adjacent to said first rubbing region with a first pre-tilt angle and such that said second rubbing region causes a tilting in said liquid crystal molecules adjacent to said second rubbing region with a second pre-tilt angle;

(B) forming a third rubbing region and a fourth rubbing region in a second molecular alignment film provided on said second substrate alternately in the form of parallel bands, said second molecular alignment film being rubbed in a second direction opposite to said first direction, such that said third rubbing region causes a tilting in said liquid crystal molecules adjacent to said third rubbing region with a third pre-tilt angle and such that said fourth rubbing region causes a tilting in said liquid crystal molecules adjacent to said fourth rubbing region with a fourth pre-tilt angle, said fourth pre-tilt angle being smaller than said first pre-tilt angle, said second pre-tilt angle being smaller than said third pre-tilt angle;

(C) assembling said first and second substrates such that said first and second molecular alignment films face each other and such that said first rubbing region and said fourth rubbing region generally overlap with each other when viewed in a direction perpendicularly to a principal surface of said first substrate;

wherein said step (C) is conducted such that said first rubbing region and said third rubbing region overlap partially when viewed in said direction perpendicular to said principal surface of said first substrate.

15. A method as claimed in claim 14, wherein said step (A) includes the steps of: forming a first molecular alignment pattern aligning said liquid crystal molecules with said second pre-tilt angle on said first molecular alignment film such that said first molecular alignment pattern covers said second rubbing region selectively; and rubbing said first molecular alignment film and said first molecular alignment pattern thereon; and wherein said step (B) includes the steps of: forming a second molecular alignment pattern aligning said liquid crystal molecules with said fourth pre-tilt angle on said second molecular alignment film such that said second molecular alignment pattern covers said fourth rubbing region selectively; and rubbing said second molecular alignment film and said second molecular alignment pattern thereon.

16. A method as claimed in claim 14, wherein said step (A) includes the steps of: irradiating a ultraviolet radiation to said first molecular alignment film such that said second rubbing region is exposed selectively; and rubbing said first molecular alignment film thus exposed; and wherein said step (B) includes the steps of: irradiating a ultraviolet radiation to said second molecular alignment film such that said fourth rubbing region is exposed selectively; and rubbing said second molecular alignment film thus exposed.

* * * * *